(No Model.)
J. F. KLEINE.
APPARATUS FOR MANUFACTURING HOLLOW BODIES OF CEMENT, &c.
No. 537,210. Patented Apr. 9, 1895.
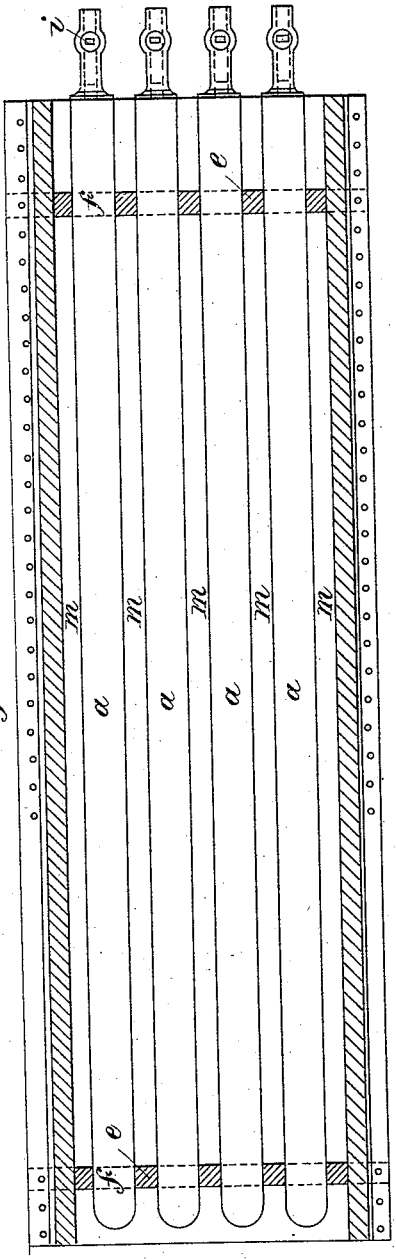
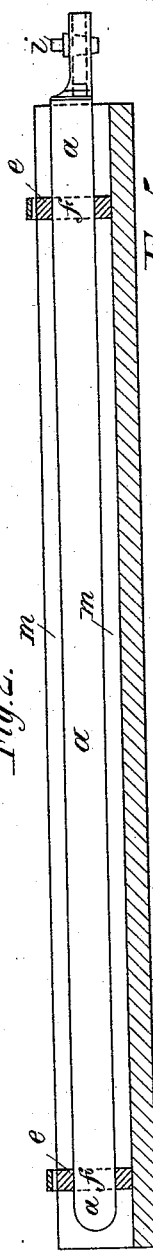
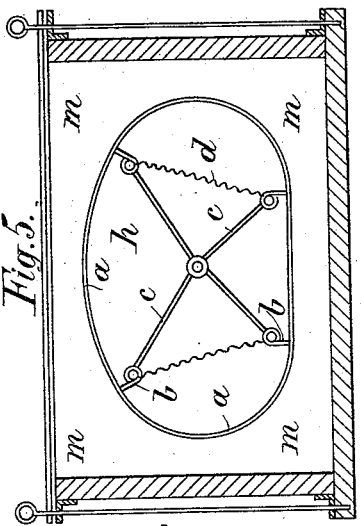
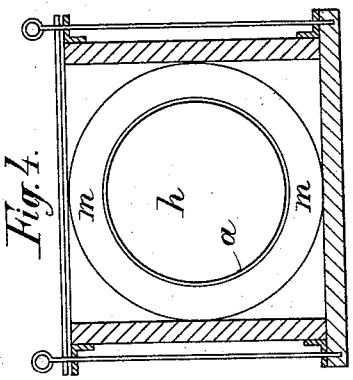
Witnesses
William Schulz
John Becker
Inventor
Johannes Franz Kleine
by his attorneys
Roeder & Briesen

UNITED STATES PATENT OFFICE.

JOHANNES FRANZ KLEINE, OF ESSEN-ON-THE-RUHR, GERMANY.

APPARATUS FOR MANUFACTURING HOLLOW BODIES OF CEMENT, &c.

SPECIFICATION forming part of Letters Patent No. 537,210, dated April 9, 1895.

Application filed August 24, 1894. Serial No. 521,206. (No model.)

*To all whom it may concern:*

Be it known that I, JOHANNES FRANZ KLEINE, a subject of the King of Prussia, German Emperor, residing at Essen-on-the-Ruhr, in the Kingdom of Prussia, German Empire, have invented new and useful Improvements in Apparatus for Manufacturing Hollow Bodies of Cement, Gypsum, or other Similar Substances, of which the following is a specification.

For manufacturing hollow bodies having the shape of plates or other forms several devices have hitherto been employed to which many defects are adherent. The hollow spaces are formed by means of solid core pieces, which in part are very smooth and tapering, in part covered with a fat layer or with a tube or the like; but in withdrawing such cores the work pieces are frequently more or less damaged. The manufacture of hollow bodies having a curved shape or of considerable length or of larger width or having the shape of bottles or pears, and the production of similar hollow spaces, has been hitherto in part impossible and offered in other cases particularly great difficulties and a large number of defective pieces. These above-mentioned disadvantages are entirely obviated by the hereinafter described apparatus.

The invention is particularly adapted for the manufacture of such hollow ware as flooring, tubes, tiles, gullies, &c., from cement, plaster of paris, wood pulp and similar material. In order to produce such hollow articles, in either straight, curved, or other form I use tubes provided on one end (or on both ends) with closing or stopping devices or cocks ($i$). The tubes are formed of such a material as is particularly adapted for the manufacture of a particular product. Thus tubes made from flax, hemp, or leather are well adapted for the manufacture of hollow bodies out of cement or plaster of paris. These tubes are filled with air or with suitable liquids ($h$) or with other similar substances. As soon as the tubes are filled and the stop devices are closed, so that the contents of the tubes are prevented from escaping, the tubes will have become very strong and may be used for forming the hollow spaces in the bodies to be manufactured. Any desired shape can be given to the tube by means of inclosed movable braces or stiffeners, such as shown in Figure 5. Within the tube are secured four metal strips $b$, bent to form eyes that are engaged by the radial arms $c$, the movement of which is controlled by tension chains $d$. Two of these strips are placed nearer together than the other two, and thus when the arms $c$, are distended, one section of the tube will be stretched while the other section will be comparatively slack. If now the tube is filled with air, gas, or a liquid, this slackened section of the tube will be likewise stretched, as far as the arms $c$, and chains $d$, will permit. In this way the first or primarily stretched tube section will have a straight form (below lower strips $b$, $b$, Fig. 5), while the subsequently stretched tube section, will have a curved form, which may be modified within certain limits. When the filling is allowed to escape from the tube, the heavy tension will at once be removed, the chains $d$, will draw the arms $c$, inward, and the tube will collapse. Thus the space occupied by the tube will be reduced, and the latter may be readily withdrawn from the work.

To produce pear-shaped, bottle-shaped or similar articles, the tubes should have a corresponding form. If inflated, they will assume the desired contour, and after the mass cast around them has sufficiently hardened, the tube is collapsed and withdrawn through the contracted neck of the casting.

A safety valve may be supplied near the stop cock, when the apparatus is intended for the manufacture of hot or red hot castings such as asphaltum, metal, glass, &c. In this case tubes made out of woven metal fabric, asbestos, or a similar strong material should be employed. With these hot castings the process is carried on substantially in the same manner as above described. The tube is fitted within the mold, and is filled either before or after the molten mass is cast, according to the liquidity and hardening properties of the latter.

The object of the safety valve is to control the inflation of the tube, when subjected to the influence of the heated molten mass, and permit the escape of any excess of pressure.

Any molding box corresponding to the desired shape of the hollow body to be manufactured may be employed. For producing hollow plates a box may be used for instance as shown in Figs. 1 to 3 of the accompanying drawings.

Fig. 1 is a horizontal section, Fig. 2 a longitudinal section, and Fig. 3 a cross section, of the said mold.

The frontal closure or partition (e) is provided with the corresponding openings (f) for introducing the tubes (a). For manufacturing pipes or the like, a molding box may be used such as illustrated by way of example in Fig. 4 in cross section. Fig. 5 is the cross section of a tube having another shape produced by suitable movable pieces mounted within the interior of the tube.

As soon as a molding box of proper shape has been prepared a sufficiently large quantity of material (m) is applied to or cast upon the plane (or curved) base as is necessary for manufacturing the body up to the lower border of the hollow spaces to be manufactured. The tubes are then introduced through the openings arranged in the front walls and placed in proper position. The filling of the tubes may be effected prior to or after their introduction. The rest of the necessary mass may now be filled in or cast in and the hollow bodies may be finished. Suitable metal pieces may be embedded within the mass in proper time during the formation of the hollow body. When the mass has sufficiently hardened, the stop devices are opened, so that the contents of the tube are allowed to escape. The tube will then collapse, so that it can readily be withdrawn. In employing tubes made from suitable flexible material this will offer no remarkable difficulties, even should the hollow spaces have a form which is several times (or simply) curved, or of unequal or bottle-shaped and similar widths or of correspondingly great length.

By making use of the above described apparatus an extraordinary result is attained in the production of hollow bodies.

The apparatus is very simple and requires no expensive devices. The very considerable friction unavoidable in withdrawing solid core pieces lying close to the walls and the deformations or the like, which easily occur and produce with certainty more or less great damages are entirely obviated in this apparatus. The production of defective pieces is as far as is possible to obtain, quite avoided and the hollow bodies manufactured with this apparatus and the intimate coherence of which is no more disturbed by friction and displacement, are of considerably greater strength and safety.

Owing to the simplicity and safety of the apparatus and to the absence of loss of work and of material occasioned by defective pieces the manufacture of hollow bodies becomes essentially cheaper.

Having now fully described and ascertained the nature of my said invention and in what manner the same may be performed, I declare that what I claim is—

1. An apparatus for manufacturing hollow articles which consists of a mold, a tube and a tension device within said tube, which is adapted to expand the same unequally, substantially as specified.

2. An apparatus for manufacturing hollow articles which consists of a mold, a tube, a set of inclosed metal strips of which one pair is placed nearer together than the other pair, and of connecting radial arms and chains, substantially as specified.

In testimony whereof I have signed my name to this specification in the presence of two subscribing witnesses.

JOHANNES FRANZ KLEINE.

Witnesses:
CARL KREISENBACH,
CHRISTIAN SHÄFFLER.